United States Patent [19]

Willard et al.

[11] Patent Number: 4,685,873

[45] Date of Patent: Aug. 11, 1987

[54] PROCESS FOR THE CONTINUOUS PRODUCTION OF PIPE FROM PARTICULATE MATERIALS

[75] Inventors: G. Fred Willard; Michael R. Wait; David A. Hutchings; Sanford K. Lauderback, all of Newark, Ohio

[73] Assignee: Owens-Corning Fiberglas Corporation, Toledo, Ohio

[21] Appl. No.: 799,889

[22] Filed: Nov. 20, 1985

Related U.S. Application Data

[63] Continuation-in-part of Ser. No. 673,827, Nov. 21, 1984, abandoned, which is a continuation of Ser. No. 482,738, Apr. 7, 1983, abandoned.

[51] Int. Cl.$^4$ ............... B29C 41/24; B29C 47/04
[52] U.S. Cl. .......................... 264/83; 156/149; 156/244.12; 156/244.13; 156/244.23; 264/103; 264/129; 264/173; 264/209.6; 264/236; 264/257
[58] Field of Search ............... 524/262; 525/344, 345, 525/354; 549/214; 264/134, 129, 135, 136, 103, 209.1, 209.6, 236, 257, 83, 173; 156/149, 244.12, 244.13, 244.23

[56] References Cited

U.S. PATENT DOCUMENTS

| | | | |
|---|---|---|---|
| 3,299,014 | 1/1967 | Kalil | 525/344 |
| 3,299,192 | 1/1967 | Lux | 264/209.1 |
| 3,461,094 | 8/1969 | Wesch | 524/262 |
| 3,702,798 | 11/1972 | Shannon | 524/262 |
| 3,737,430 | 6/1973 | Brown et al. | 549/214 |
| 3,847,860 | 11/1974 | Seiler et al. | 524/262 |
| 3,855,175 | 12/1974 | Kakizaki | 524/262 |
| 4,115,498 | 9/1978 | Kissell et al. | 264/236 |
| 4,145,491 | 3/1979 | Ryan | 525/344 |
| 4,251,477 | 2/1981 | Christian et al. | 264/82 |
| 4,394,475 | 7/1983 | Temple et al. | 524/262 |

FOREIGN PATENT DOCUMENTS

| | | | |
|---|---|---|---|
| 876033 | 8/1961 | United Kingdom | 524/262 |
| 0735613 | 5/1980 | U.S.S.R. | 524/262 |

Primary Examiner—Willard E. Hoag
Attorney, Agent, or Firm—Robert F. Rywalski; John C. Smith; Patrick P. Pacella

[57] ABSTRACT

A process for continuously producing pipe by coating a particulate material with a gas curable resin, compacting the coated particulate material in an annular space, treating the compacted, coated particulate material with a curing gas to form a pipe having a porous wall structure, impregnating the porous walls of the pipe with an asphalt or resinous material, and, optionally, winding a reinforcing filament binder around the pipe.

33 Claims, 1 Drawing Figure

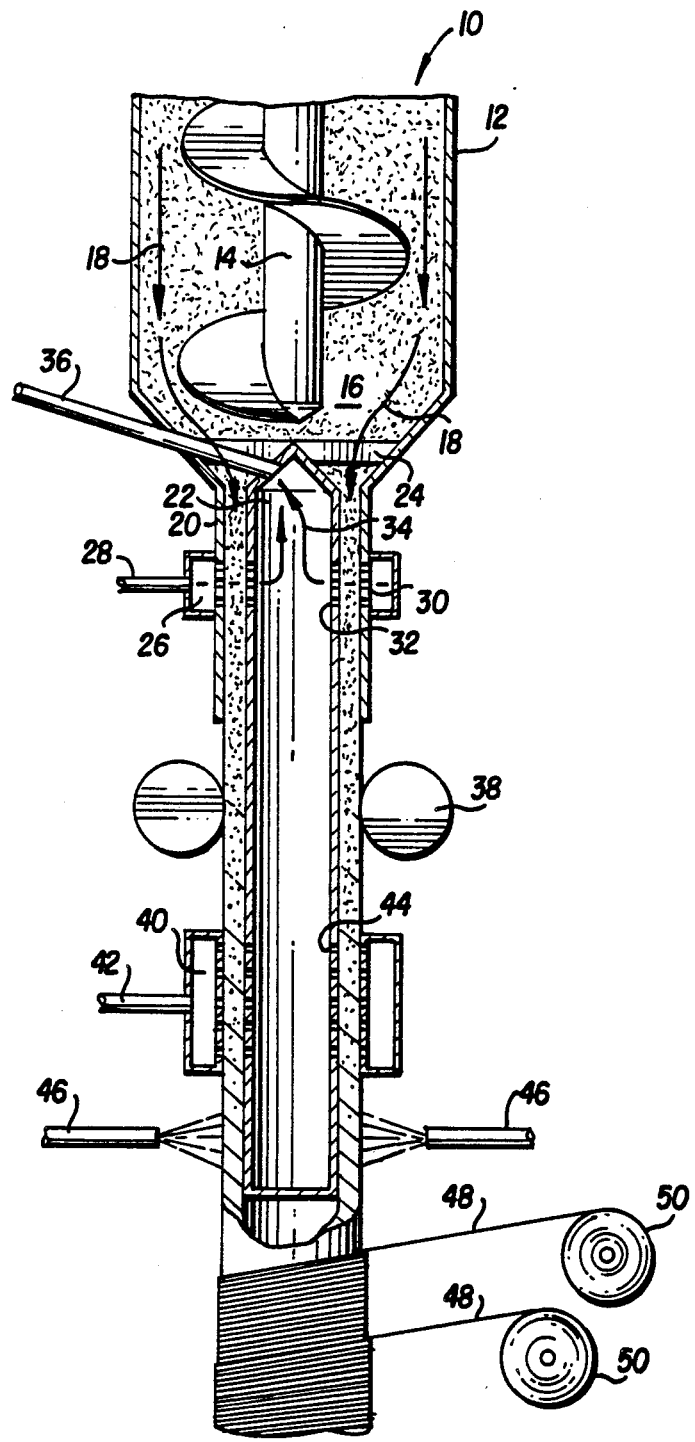

PROCESS FOR THE CONTINUOUS PRODUCTION OF PIPE FROM PARTICULATE MATERIALS

CROSS-REFERENCE TO RELATED APPLICATIONS

This is a continuation-in-part of copending application Ser. No. 673,827 filed Nov. 21,1984, which in turn is a continuation of copending application Ser. No. 482,738 filed Apr. 7, 1983, both now abandoned.

BACKGROUND OF THE INVENTION

In the preparation of molded fiberglass pipe and other parts it is conventional to collect the glass fibers as bats which have a binder on their surface and to cure the binder to maintain the bats as coherent masses. These glass bats are then molded under heat and pressure in contact with organic resins. The molding process cures the resins and retains the fiberglass bats in their molded form.

There has been a considerable interest in proposed processes for producing pipe and molded parts without the necessity of application of heat and pressure. These processes involve melting glass batch and forming fibers from the melted glass. The fibers are collected in the form of bats, the bats are contacted with a rapidly curing chemical system and the corresponding curing agent and simultaneously molded under pressure but at room temperature. These procedures have now been advanced to the extent of allowing their application to manufacturing, in a few simple steps, items which were previously manufactured in a series of complex steps. These procedures allow their application to mixtures of particulate materials rather than a single material to produce products superior in strength to those employing the single material.

STATEMENT OF THE INVENTION

According to the present invention there is provided a method for rapidly and continuously forming a pipe which comprises coating a particulate material with a gas-curable resin, continuously shaping and compacting the resin-coated particulate material into the shape of a pipe, subjecting the resin-coated and compacted particulate material to a curing gas in a curing section to form pipe, continuously conveying the pipe from the curing section to a finishing section, and finishing the pipe by impregnating the pipe with an asphalt or resinous composition and, optionally, wrapping the exterior surface of the pipe with a filament binder.

The method of this invention may be employed to form pipe or pipe fittings of any dimension.

DESCRIPTION OF THE INVENTION

The first step of the process of the present invention is selecting the particulate material for forming the pipe. Any type of particulate material may be used. The particulates can be naturally occurring such as sand or can be the result of crushed materials. The term "particulate" includes sand, mica, sawdust, glass fiber and other substances to which an acid gas-curable resin will adhere. The glass fiber particulate materials include those types commonly known as textile glass fibers and wool. The textile glass fibers can be employed either as chopped fibers or continuous fibers or a mixture of both. Wool can be employed in any form, for example, in the form of elongated wrappings or ground particles.

In the next step of the process of the present invention the particulate material is coated with an acid gas curable resin. Any suitable acid gas-curable resin system can be employed. Suitable resins include urea formaldehydes, phenol formaldehydes, furans and furan copolymers.

An oxidizing agent is incorporated in the acid gas-curable resin to accelerate the gas-curing process. Suitable oxidizing agents include peroxides, hydroperoxides, hydrooxyhydroperoxides, ring-substituted aralkyl hydroperoxides and perbenzoates. The oxidizing agent may be present in the resin in an amount ranging from about 1% to about 50% by weight based on the weight of the resin, about 5% to about 30% by weight being preferable and about 15% by weight being optimum. Too high a proportion of oxidizing agent to resin is undesirable since this may result in excessive heating during the curing step.

The amount of acid gas curable resin applied to the particulate material may range between about 0.5% and about 20% by weight based upon the weight of the particulate material, about 0.5% to about 10% by weight being the preferred range. An excessive amount of resin is undesirable since it may reduce the gas permeability of the shaped and compacted resin-coated particulate material such that during the subsequent curing step at least a portion of the resin will not be fully cured by the curing gas. The surface tension of the resin will to a great extent determine the maximum amount of resin which may be used without adversely affecting permeability of the shaped and compacted resin-coated particulate material.

A coupling agent such as a silane optionally may be added to the acid gas-curable resin and oxidizing agent if desired. Suitable silanes include 3-aminopropyltriethoxysilane, 3-aminopropyltrimethoxysilane and other amine substituted silyl ethers. The silane, when used, may be present in an amount ranging from about 0.05% to about 2.0% by weight, preferably about 0.1% to about 1.0% by weight, of the acid gas-curable resin.

The particulate material may be coated with the acid gas-curable resin, containing the oxidizing agent and optional coupling agent, by either continuous or batch-mixing systems utilizing an agitator or a screw, respectively. The acid gas-curable resin, oxidizing agent and optional coupling agent may be added as a mixture or as individual components to the particulate material in the mixing system to achieve uniform distribution of the resin and oxidizing agent and optional coupling agent over the surfaces of the particulate material.

The particulate material, coated with the mixture of resin and oxidizing agent and optional coupling agent, is then continuously formed and compacted into an annular pipe configuration between an exterior annular mold and an interior mandrel.

The compacted, coated particulate material in the pipe configuration is then exposed to a gas or aerosol curing agent by passing the curing agent through the gas-permeable compacted material in a direction transverse to the axis of the pipe between perforations in the exterior annular mold and perforations in the mandrel. Suitable acid gas-curing agents include sulfur dioxide and sulfuryl chloride. The amount of acid gas curing agent which is dispersed through the compacted, coated particulate material must be sufficient to fully cure the acid gas-curable resin. Theoretically, the amount of gaseous curing agent required would be the molar equivalent to the amount of reactive oxidizing agent present. However, to assure complete reaction of the oxidizing agent with the acid gas curing agent an excessive amount of acid gas curing agent must be diffused through the compacted, coated particulate material. The amount of acid gas curing agent diffused through the compacted, coated particulate material may range up to about 3.0 molar equivalents per mol of oxidizing agent. The acid gas curing agent is dispersed through the compacted coated particulate material for a period of from about 0.5 seconds to about 2.0 minutes. The resin curing operation may be carried out at temperatures ranging from about room temperature to temperatures as high as about 130° F. to about 140° F. Higher temperatures may adversely affect the stability of the oxidizing agent.

The resultant cured pipe, though having a porous wall structure, has sufficient strength to be self-supporting and is fed continuously out of the end of the exterior annular mold. The porous walls of the pipe are then impregnated with a sealant such as a resinous or asphaltic composition in any suitable manner such as by means of an impregnation manifold surrounding the cured pipe. Any suitable resin including both thermoplastic and thermosetting resins can be employed. Examples of suitable resins include polystyrene, polyethylene, polystyrene cross-linked polyester thermosets and furan-phenolic thermosets. Any suitable asphalt or asphalt-containing composition may be employed. The resinous or asphaltic composition is heated to a temperature of about 125° C. to about 200° C. depending upon its composition and viscosity. The pipe walls, maintained between their exterior and interior surfaces at a pressure differential of about one-quarter to one-half atmospheric pressure, are impregnated with the heated resinous or asphaltic composition after which the impregnated pipe may be cooled to room temperature by water sprayed on the exterior surface of the pipe or by any other suitable means.

The impregnated pipe may be wound with a filament such as a resinous or glass filament. The glass filament, which is preferred, has a denier of about 1 to about 15, preferably about 1.5 to about 10.0. The winding is carried out in any suitable manner. Since the process is a continuous process, the preferred method of winding is to move the pipe past a conventional winding machine and wind the filament about the pipe as it is rotated.

BRIEF DESCRIPTION OF THE DRAWING

The features and advantages of the present invention will become more clearly appreciated from the following description taken in conjunction with the accompanying FIGURE which is a schematic cross-sectional view of apparatus and a pipe formed therein from particulate materials.

DETAILED DESCRIPTION OF THE INVENTION

The preferred embodiment of the process of the present invention is shown graphically in the FIGURE. A suitable particulate material coated with a mixture of an appropriate acid gas-curable resin and an oxidizing agent is fed at 10 into a funnel-shaped receptical 12. A rotating auger 14 compacts the coated particulate material in the zone 16 as the particulate material moves downwardly in the direction shown by the arrows 18. The compacted particulate material is fed into an elongated annular space defined by an external annular mold 20 and an internal hollow mandrel 22 which is supported by cross-members 24 in the receptacle 12.

The acid curing gas is fed into an annular chamber 26 through conduit 28, through perforations 30 in the external annular mold 20, through the particulate material coated with the acid gas-curable resin and oxidizing agent, and through perforations 32 in the mandrel 22 into the interior thereof where it is exhausted, as indicated by arrows 34, through exhaust conduit 36. Alternatively, the curing gas may be fed in the opposite direction through conduit 36, mandrel 22, perforations 32, the particulate material coated with the resin and oxidizing agent, perforations 30, chamber 26 and conduit 28. The compacted particulate material coated with the acid gas-curable resin and oxidizing agent is cured by the curing gas passing therethrough to form pipe having sufficient tensile strength to be self-supporting.

The newly formed pipe is drawn by rollers 38 from the end of the external annular mold and fed through an impregnation manifold 40 where the newly formed pipe is impregnated with a resinous or asphaltic compound fed through conduit 42 into the impregnation manifold 40, an appropriate pressure differential being maintained between the exterior and interior walls of the newly formed pipe to assure complete impregnation of the pipe. Perforations 44 may be provided in the lower portion of the mandrel to avoid any back pressure during impregnation of the newly formed pipe. The impregnated pipe is then cooled to room temperature by water sprayed through nozzles 46 on the exterior surface of the impregnated pipe.

Optionally, either simultaneously with or subsequent to the impregnation step, the pipe may be wound with filaments 48, such as glass filaments, from filament supplies 50.

Since this is a continuous process the pipe may be formed to any desired length.

It will be evident from the foregoing that various modifications can be made to this invention; such, however, are within the scope of the invention.

We claim:

1. A process for continuously producing pipe which comprises:
 (a) coating a particulate material with an acid gascurable resin and an oxidizing agent suitable for accelerating curing of the resin, the amount of resin relative to the amount of particulate material being insufficient to reduce gas permeability of the compacted coated particulate material recited herebelow;
 (b) compacting and forming said coated particulate material into an annular pipe configuration, which is gas permeable, in an annular space defined by the inlet ends of spaced inner and outer walls;
 (c) feeding said compacted coated particulate material in said annular pipe configuration along a path, the initial part of which is said annular space between said inner and outer walls;
 (d) feeding an acid curing gas through perforations in one of said inner and outer walls and through said gas permeable compacted coated particulate material in said annular pipe configuration as said compacted coated particulate material in said annular pipe configuration moves along said path and is supported by said inner and outer walls to diffuse said curing gas through said compacted coated particulate material and cure said resin and form said particulate material into a self-supporting pipe having a porous wall;

(e) gripping said self-supporting pipe at a position along said path downstream from the outlet end of said outer wall and drawing said self-supporting pipe along said path;

(f) feeding a sealant into said porous wall of said self-supporting pipe to impregnate said porous wall with said sealant at a position along said path downstream from said outlet end of said outer wall; and (g) recovering the cured and impregnated pipe.

2. The process according to claim 1 wherein said particulate material is selected from the group consisting of sand, glass fibers and mixtures thereof.

3. The process according to claim 1 wherein said particulate material is coated with an acid gas-curable resin selected from the group consisting of urea formaldehydes, phenol formaldehydes, furans and furan copolymers.

4. The process according to claim 3 wherein said particulate material is coated with an oxidizing agent selected from the group consisting of peroxides, hydroperoxides, hydrooxyhydroperoxides, ring-substituted aralkyl hydroperoxides and perbenzoates.

5. The process according to claim 3 wherein said acid gas-curable resin applied to said particulate material ranges between about 0.5% and about 20% by weight based upon the weight of said particulate material.

6. The process according to claim 3 wherein said acid gas-curable resin applied to said particulate material ranges between about 0.5% and about 10% by weight based upon the weight of said particulate material.

7. The process according to claim 4 wherein said oxidizing agent applied to said particulate material ranges between about 1% and about 50% by weight based on the weight of said resin.

8. The process according to claim 4 wherein said oxidizing agent applied to said particulate material ranges between about 5% and about 30% by weight based on the weight of said resin.

9. The process according to claim 4 wherein said oxidizing agent applied to said particulate material is about 15% by weight based on the weight of said gas-curable resin.

10. The process according to claim 4 further comprising adding a coupling agent to said acid gas-curable resin and oxidizing agent coated on said particulate material.

11. The process according to claim 10 wherein said coupling agent is a silane.

12. The process according to claim 11 wherein said silane is selected from the group consisting of 3-aminopropyltriethoxysilane and 3-aminopropyltrimethoxysilane.

13. The process according to claim 11 wherein the amount of said silane applied to said particulate material ranges between about 0.05% to about 2.0% by weight based upon the weight of said acid gas-curable resin.

14. The process according to claim 11 wherein the amount of said silane applied to said particulate material ranges between about 0.1% to about 1.0% by weight based upon the weight of said acid gas-curable resin.

15. The process according to claim 4 wherein said acid curing gas is selected from the group consisting of sulfur dioxide and sulfuryl chloride.

16. The process according to claim 15 wherein the amount of said acid curing gas diffused through said compacted coated particulate material ranges up to about 3.0 molar equivalents per mol of oxidizing agent.

17. The process according to claim 16 wherein said acid gas curing agent is diffused through said compacted coated particulate material for a period of from about 0.5 seconds to about 2.0 minutes.

18. The process according to claim 16 wherein said resin on said particulate material is cured by said acid curing gas at a temperature ranging from room temperature to 140° F.

19. The process according to claim 1 wherein said sealant for impregnating said self-supporting pipe is selected from the group consisting of an asphaltic composition and a resinous composition.

20. The process according to claim 19 wherein said resinous composition is selected from the group consisting of thermoplastic and thermosetting resins.

21. The process according to claim 20 wherein said resin is selected from the group consisting of polystyrene, polyethylene, polystyrene cross-linked polyester thermosets and furan-phenolic thermosets.

22. The process according to claim 1 further comprising the step of winding a resinous or glass filament about the exterior surface of said impregnated pipe.

23. The process according to claim 22 wherein the denier of said filament is between about 1 and about 15.

24. The process according to claim 23 wherein the denier of said filament is between about 1.5 and about 10.

25. the process according to claim 1 wherein said acid gas-curable particulate material is compacted by forcing the particulate material with said auger into an annular space.

26. A process for continuously producing pipe which comprises:

(a) coating a particulate material selected from the group consisting of sand and glass fibers and mixtures thereof with a mixture of an acid gas-curable resin selected from the group consisting of urea fomaldehydes, phenol formaldehydes, furans and furan copolymers and an oxidant selected from the group consisting of peroxides, hydroperoxides, hydrooxyperoxides, ring-substituted aralkyl hydroperoxides and perbenzoates, the amount of resin relative to the amount of particulate material being insufficient to reduce gas permeability of the compacted coated particulate material recited herebelow;

(b) compacting and forming said acid gas-curable resin coated particulate material into an annular pipe configuration, which is gas curable, by forcing it into an annular space defined by the inlet ends of spaced inner and outer walls by means of an auger;

(c) feeding said compacted coated particulate material in said annular pipe configuration along a path, the initial part of which is said annular space between said inner and outer walls;

(d) feeding an acid curing gas, selected from the group consisting of sulfur dioxide and sulfuryl chloride, through perforations in one of said inner and outer walls and through said gas permeable compacted coated particulate material in said annular pipe configuration as said compacted coated particulate material in said annular pipe configuration moves along said path and is supported by said inner and outer walls to diffuse said curing gas through said compacted coated particulate material and cure said resin and form said particulate material into a self-supporting pipe having a porous wall;

(e) gripping said self-supporting pipe at a position along said path downstream from the outlet end of said outer wall and drawing said self-supporting pipe along said path;

(f) feeding a sealant, selected from the group consisting of asphaltic and resinous compositions, into said porous wall of said self-supporting pipe to impregnate said porous wall with said sealant, at a position along said path downstream from said outlet end of said outer wall;

(g) applying a filament binding to the exterior surface of the impregnated pipe; and (h) recovering the cured and impregnated pipe.

27. The process according to claim 15 wherein said sealant for impregnating said self-supporting pipe is selected from the group consisting of an asphaltic composition and a resinous composition.

28. The process according to claim 27 wherein said resinous composition is selected from the group consisting of thermoplastic and thermosetting resins.

29. The process according to claim 28 wherein said resin is selected from the group consisting of polystyrene, polyethylene, polystyrene cross-linked polyester thermosets and furan-phenolic thermosets.

30. The process of claim 1 wherein said self-supporting pipe having a porous wall is continuously fed along said path through a manifold surrounding said porous wall of said selfsupporting pipe and said sealant is fed under pressure from said manifold into said porous wall of said pipe to impregnate and seal said porous wall.

31. The process of claim 26 wherein said self-supporting pipe having a porous wall is continuously fed along said path through a manifold surrounding said porous wall of said selfsupporting pipe and said sealant is fed under pressure from said manifold into said porous wall of said pipe to impregnate and seal said porous wall.

32. The process according to claim 26 wherein said resinous composition is selected from the group consisting of thermoplastic and thermosetting resins.

33. The process according to claim 32 wherein said resin is selected from the group consisting of polystyrene, polyethylen, polystyrene cross-linked polyester thermosets and furan-phenolic thermosets.

* * * * *